(12) United States Patent
Wagner et al.

(10) Patent No.: US 9,797,636 B2
(45) Date of Patent: Oct. 24, 2017

(54) PLATE APPARATUS SUITABLE FOR HEAT AND/OR MATERIAL EXCHANGE

(71) Applicant: API Schmidt-Bretten GmbH & Co. KG, Bretten (DE)

(72) Inventors: Volker Wagner, Muhlacker (DE); Nina Merkel, Karlsruhe (DE); Karlheinz Schaber, Malsch (DE)

(73) Assignee: API Schmidt-Bretten GmbH & Co. KG, Bretten (DE)

( * ) Notice: Subject to any disclaimer, the term of this patent is extended or adjusted under 35 U.S.C. 154(b) by 0 days.

(21) Appl. No.: 15/116,902

(22) PCT Filed: Feb. 5, 2015

(86) PCT No.: PCT/EP2015/000236
§ 371 (c)(1),
(2) Date: Aug. 5, 2016

(87) PCT Pub. No.: WO2015/117759
PCT Pub. Date: Aug. 13, 2015

(65) Prior Publication Data
US 2016/0348950 A1 Dec. 1, 2016

(30) Foreign Application Priority Data
Feb. 6, 2014 (DE) .................. 10 2014 001 499

(51) Int. Cl.
*F25B 37/00* (2006.01)
*F28D 9/00* (2006.01)
*F28D 21/00* (2006.01)

(52) U.S. Cl.
CPC .............. *F25B 37/00* (2013.01); *F28D 9/005* (2013.01); *F28D 21/0015* (2013.01); *F28D 2021/0022* (2013.01); *Y02B 30/62* (2013.01)

(58) Field of Classification Search
CPC ........ F25B 39/022; F25B 37/00; F28D 9/005; F28D 21/0015; F28D 2021/0022; F28F 3/10; F28F 9/026; F28F 9/0273
See application file for complete search history.

(56) References Cited

U.S. PATENT DOCUMENTS 7,090,807 B1 * 8/2006 Brauchle .............. B01D 53/864
422/198
7,186,389 B2 * 3/2007 Filippi ................... B01J 8/0285
165/157

(Continued)

FOREIGN PATENT DOCUMENTS

DE 1269144 B 5/1968
DE 19734131 A1 2/1999

(Continued)

OTHER PUBLICATIONS

Int'l Preliminary Report dated Aug. 18, 2016 in Int'l Application No. PCT/EP2015/000236.

(Continued)

Primary Examiner — Tho V Duong
(74) Attorney, Agent, or Firm — Panitch Schwarze Belisario & Nadel LLP (57) ABSTRACT

A plate apparatus suitable for heat and/or material exchange has plates ($P_0$, $P_1$, $P_2$, $P_3$) contacting each other flush along a peripheral seal (1) while forming respective intermediate spaces ($Z_0$, $Z_1$, $Z_2$, $Z_3$) and having upper (2, 3) and lower (4, 5) through-flow openings for fluids. A group of these upper and lower through-flow openings (2, 5) is allocated to at least two fluids and is connected by correspondingly placed seals to every second plate intermediate space ($Z_1$, $Z_3$) carrying a flow from top to bottom. In flush upper through-flow openings (2) of plates ($P_0$, $P_1$, $P_2$, $P_3$) a distribution lance (6) runs across these openings and has outlet openings (6a) for at least one of the fluids. It is essential that the outlet (Continued)

openings (6a) are directed into those plate intermediate spaces ($Z_0$, $Z_2$) arranged between the second plate intermediate spaces ($Z_1$, $Z_3$) for the fluids to be mixed.

20 Claims, 6 Drawing Sheets

(56) References Cited

U.S. PATENT DOCUMENTS

| | | |
|---|---|---|
| 2002/0174978 A1 | 11/2002 | Beddome et al. |
| 2003/0010483 A1 | 1/2003 | Ikezaki et al. |
| 2006/0140844 A1* | 6/2006 | Filippi .................... B01J 8/008 423/392 |
| 2008/0216996 A1* | 9/2008 | Risberg ................. F28D 9/005 165/167 |
| 2009/0151917 A1* | 6/2009 | Meschke ................ F28D 9/005 165/168 |
| 2015/0292803 A1* | 10/2015 | Nyander ................... F28F 3/10 165/166 |

FOREIGN PATENT DOCUMENTS

| | | | |
|---|---|---|---|
| DE | 10322406 | A1 | 12/2004 |
| DE | 112005002226 | T5 | 9/2007 |
| DE | 202008004582 | U1 | 6/2008 |
| EP | 1774248 | B1 | 6/2013 |
| FR | 2993647 | A1 | 1/2014 |
| JP | H08271091 | A | 10/1996 |
| JP | 2002022309 | A | 1/2002 |
| JP | 2006200852 | A * | 8/2006 ............ F28F 9/0273 |
| WO | 9414021 | A1 | 6/1994 |
| WO | 2009062738 | A1 | 5/2009 |

OTHER PUBLICATIONS

Int'l Search Report dated Nov. 5, 2015 in Int'l Application No. PCT/EP2015/000236.

Office Action dated Oct. 6, 2014 in DE Application No. 102014001499.1.

* cited by examiner

PLATE APPARATUS SUITABLE FOR HEAT AND/OR MATERIAL EXCHANGE

CROSS-REFERENCE TO RELATED APPLICATIONS

This application is a Section 371 of International Application No. PCT/EP2015/000236, filed Feb. 5, 2015, which was published in the German language on Aug. 13, 2015, under International Publication No. WO 2015/117759 A1 and the disclosure of which is incorporated herein by reference.

BACKGROUND OF THE INVENTION

The invention relates to a plate apparatus suitable for heat and/or material exchange having a plurality of plates that contact each other flush along a peripheral seal while forming respective intermediate spaces and that have upper through-flow openings and lower through-flow openings for fluids, wherein a group of these upper and lower through-flow openings is allocated to at least two fluids to be mixed and is connected by correspondingly placed seals to every second plate intermediate space that carries a flow from top to bottom, and wherein in flush upper through-flow openings of the specified group a distribution lance runs across these openings and has outlet openings for at least one fluid.

To the extent the terms "seal" or "sealed" or the like are used here and in the following, these should be considered to relate not only to separate, standalone seals between adjacent plates, but also to include the material-joining connection of plates by welding or soldering—thus without additional sealing.

The invention is based on known plate heat exchangers, in which the through-flow openings are sealed relative to the plate intermediate spaces, such that every second plate intermediate space carries a flow of one fluid and the plate intermediate spaces lying therebetween carry a flow of the other fluid. As an example, DE 103 22 406 of the same applicant is referenced, whose content is incorporated herein by reference and is thus also included in the content of the present application. The theme of that application is the most uniform possible loading of the plate gap by the in-flowing medium. For that purpose, it is proposed to provide on the inflow side of the plate a plurality of inflow openings, which extend across the entire width of the plate and thus cause a more uniform loading of the plate gap across its width.

Consequently, there is also the need to load every second plate intermediate space with two different phases of a fluid, namely both with the liquid phase and also the gaseous phase. In this case, care must be taken, especially for the liquid phase, that a uniform distribution to the allocated plate intermediate spaces is ensured. For this purpose DE 1 269 144, from which the present application starts, proposes to arrange a distribution lance in the form of a spray tube in the upper through-flow openings. This spray tube has radially running spray openings, through which the fluid is supplied to plate intermediate spaces allocated to it while crossing the surrounding gas space. In this way, a thorough mixing of the liquid phase with the gas phase is produced before and in the plate intermediate space.

BRIEF SUMMARY OF THE INVENTION

The present invention is based on the object of further improving the thorough mixing of the two phases, in particular ensuring a wetting of the plate surface by the liquid phase across the entire plate width. Here, a large contact surface between both fluids should be created, so that not only physical reactions, in particular absorption processes, but also chemical reactions between the two fluids are promoted. As a result, the present invention should be suitable not only for the mixing and reaction of liquid and gaseous phases of the same medium, but also of different media. Not least of all, the invention should be distinguished by a compact and economical construction.

This object is achieved according to the invention, in that the outlet openings of the distribution lance are directed into those plate intermediate spaces that are arranged between the specified second plate intermediate spaces.

Thus, the outlet openings for the fluids to be mixed are not directed toward the allocated plate intermediate spaces, but instead toward the adjacent "incorrect" plate intermediate spaces. With respect to their area used for heat transfer, these adjacent plate intermediate spaces are blocked in the usual way by seals, that is, in terms of the essential part of the plate intermediate spaces with respect to the fluids to be mixed. Thus, the specified fluids can flow only into the upper edge region of the "incorrect" plate intermediate spaces, namely only up to the specified seal that runs, in general, a few millimeters to a few centimeters underneath the upper through-flow opening. In this way, the fluid mixture, especially its liquid phase, builds up above the specified seal until the fluid level rises to the lower edge of the through-flow openings lying above. Then the fluid can flow through these through-flow openings into the "correct" open plate intermediate space. The through-flow openings thus form, to some extent, a dam that builds up the fluid in the "incorrect" plate intermediate space, so that the fluid can overflow into the "correct" plate intermediate spaces allocated to it only when it reaches a sufficient fill quantity. This results in a pressure-less distribution of the fluid to the "correct" plate intermediate spaces and to an optimal thin-film wetting as it flows downward.

The use of the through-flow openings as dams has the result that the fluid is distributed optimally in the plate intermediate spaces, and indeed not only by wetting of the entire plate width, but also with respect to the uniform loading of the plate intermediate spaces following one after the other in the lance direction.

At the same time, it results in an enlargement of the contact surface between the two fluids, which significantly accelerates reactions between the two fluids. These reactions can be absorption processes, especially if one fluid exists in a liquid phase and the other fluid is in a gaseous phase; however, they could also be chemical reactions. In both cases, through heating or cooling media that flow through the adjacent plate intermediate spaces, heat can be supplied or dissipated depending on whether the process is an endothermic or exothermic process.

The plate apparatus according to the invention therefore opens up completely new application possibilities in physical and chemical process engineering.

It is also within the scope of the invention, however, especially for adiabatic processes, to shut down those plate intermediate spaces that typically carry a flow of a heating or cooling medium, and to use them just for forming the desired dams.

It is especially expedient if the outlet openings of the distribution lance are arranged directly in the plate intermediate spaces. Then, they do not have to run at an angle, but instead can be oriented in the radial direction, which significantly increases the accuracy and is especially also independent of the discharge speed of the fluid.

For better use of the damming function, it is expedient that the through-flow openings, in which the distribution lance runs, do not have the typical round contour, at least in the lower region, but instead have an approximately horizontal edge that runs significantly above its allocated seal and extends over at least approximately 60%, preferably at least approximately 75%, of the maximum width of the through-flow opening.

In addition, it is recommended that the plates underneath the through-flow openings surrounding the distribution lance have at least one significantly smaller discharge opening. This has the function that built-up fluid can still be discharged into the "correct" plate intermediate space, if the plate apparatus is no longer operating. The discharge openings therefore should be positioned in the lowest region directly over the seal surrounding the through-flow openings.

Because the distribution lance has a much smaller diameter than the through-flow openings surrounding it, it is recommended that it carries a flow of only the liquid phase, while the gas phase flows in the annular space surrounding the distribution lance. However, if both fluids are liquids, then it is recommended to feed the more viscous and/or heavier specific weight fluid to the distribution lance.

In the preferred use of the plate apparatus for the absorption of a refrigerant in the context of an absorption cooling unit or absorption heat pump, it is expedient to absorb refrigerant vapor by a liquid. Here, the adjacent plate intermediate spaces carry a flow of a coolant, which receives and dissipates the heat produced during the absorption.

In those use cases in which no exothermic or endothermic reactions take place in the plate apparatus, it is recommended that the plate intermediate spaces, that can be connected to a heating or cooling medium and are shut down in this case, contain spacers which ensure that the adjacent plate intermediate spaces carrying a flow of fluid do not buckle.

The spacers are expediently formed by wave profiles, which extend strip-shaped through the plate intermediate space to be supported.

Another expedient refinement of the invention consists in that the so-called second plate intermediate spaces, that is, those spaces where physical or chemical processes or reactions take place between multiple fluids, have a greater gap thickness than the adjacent plate intermediate spaces. The ratio of the gap thicknesses expediently lies between 1:1 and 1:2, depending on the different volume flows.

For further increasing the contact surface between the two fluids to be mixed with each other, it is recommended in one refinement of the invention to provide a wave-shaped running intermediate layer in the plate intermediate space allocated to the fluids, wherein this layer contacts at least one plate, preferably both plates, at its wave peaks and is perforated by a plurality of holes. In this way, the fluids are subjected to constant swirling and mixing while flowing down through the plate intermediate space. At the same time, this intermediate layer can function as a spacer, regardless of which pressure differences exist between adjacent plate intermediate spaces.

Preferred applications of the plate apparatus according to the invention are described below and in the claims. Here, the main advantage of the invention is that namely media whose viscosity is very different are mixed optimally in the plate intermediate spaces allocated to them, because the overflow dam produces a wide fluid distribution across the plate width already in the inflow area from the approximately point-wise fluid flow. In terms of energy it is especially beneficial that the distribution of the fluid having the higher viscosity to the individual plate gaps no longer has to be realized as before by high pressures and corresponding pressure losses in the distribution lance.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
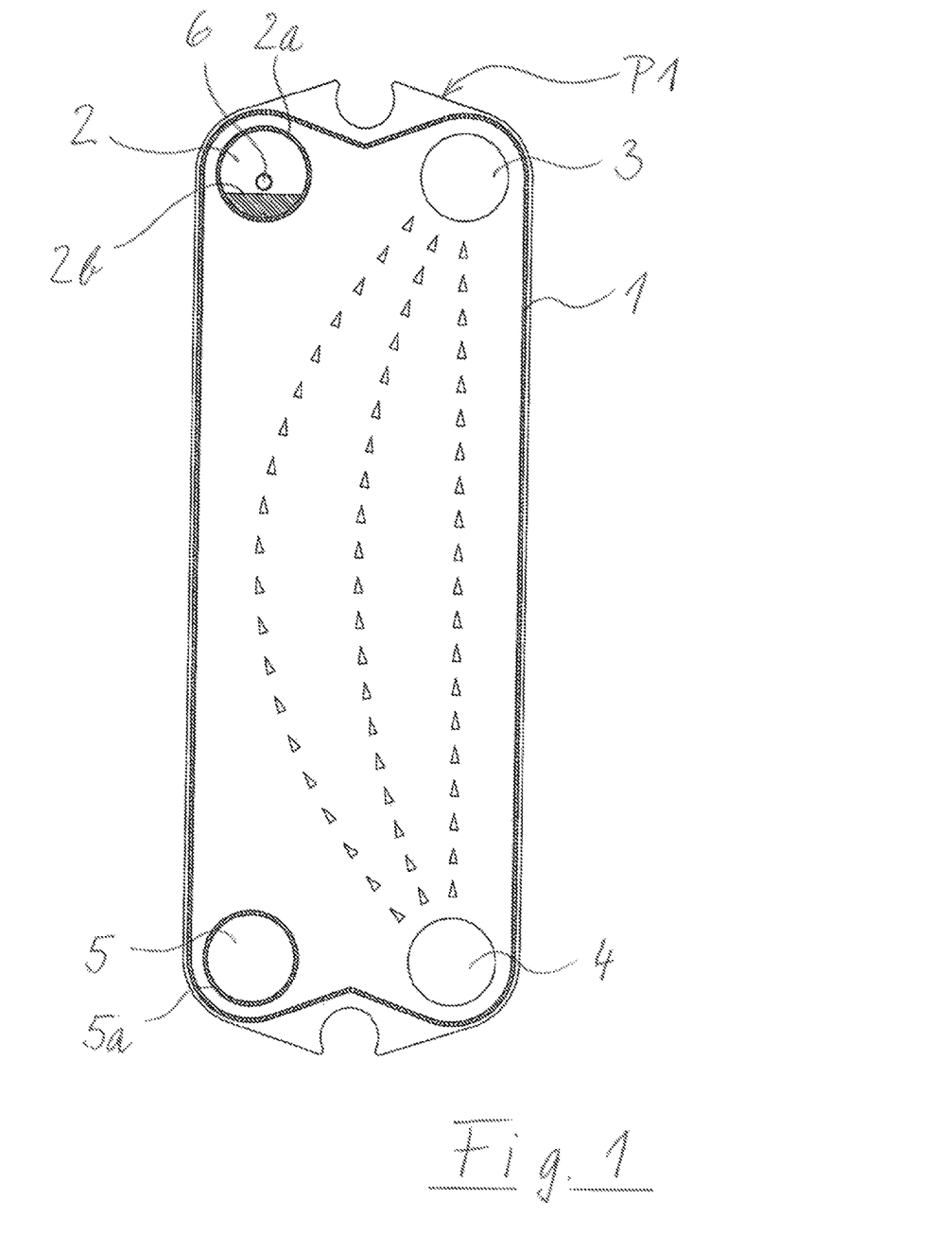
FIG. 1 is a plan view of one plate of the plate apparatus according to an embodiment of the invention.

FIG. 1 shows a plan view of a plate $P_1$ of a conventional plate heat exchanger. It has on its outer periphery a peripheral edge seal 1 and at its four corner regions the four typical through-flow openings 2, 3, 4 and 5. Here, two upper/lower opposing through-flow openings—here the through-flow openings 2 and 5—are blocked by sealing rings 2a and 5a relative to the visible heat transfer surface of the plate, while the two other through-flow openings 3 and 4 opposite them are open, so that the fluid flowing into these through-flow openings can wet the visible plate surface, as is indicated by the illustrated arrows. The visible plate side thus belongs to a plate intermediate space $Z_0$ or $Z_2$ in FIG. 2, which typically carries a flow of a heating or cooling agent.

Behind the shown plate $P_1$, however, there is an intermediate space $Z_1$ or $Z_3$ (see FIG. 2) that is allocated to the fluids to be mixed. Therefore, the through-flow openings 3 and 4 are surrounded there by seals, while the seals 2a and 5a are missing on the back side of the shown plate.

Figure 2:
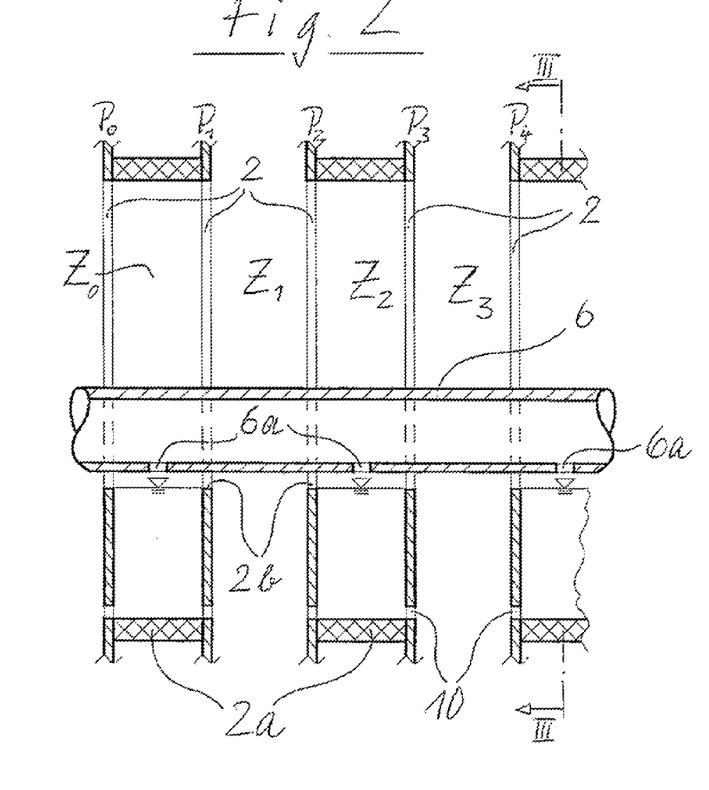
FIG. 2 is an enlarged vertical section through multiple plates arranged one next to the other in an embodiment of the invention.

It can also be seen in FIGS. 1 and 2 that a distribution lance 6 having a significantly smaller diameter is arranged in the upper through-flow openings 2. This distribution lance 6 runs, as FIG. 2 shows, axially through the through-flow openings 2 of adjacent plates $P_0$, $P_1$, $P_2$, $P_3$, $P_4$. In those plate intermediate spaces that are not allocated to the fluids to be mixed, that is, in the "incorrect" plate intermediate spaces $Z_0$ and $Z_2$, the distribution lance 6 has downward projecting outlet openings 6a.

Figure 3:
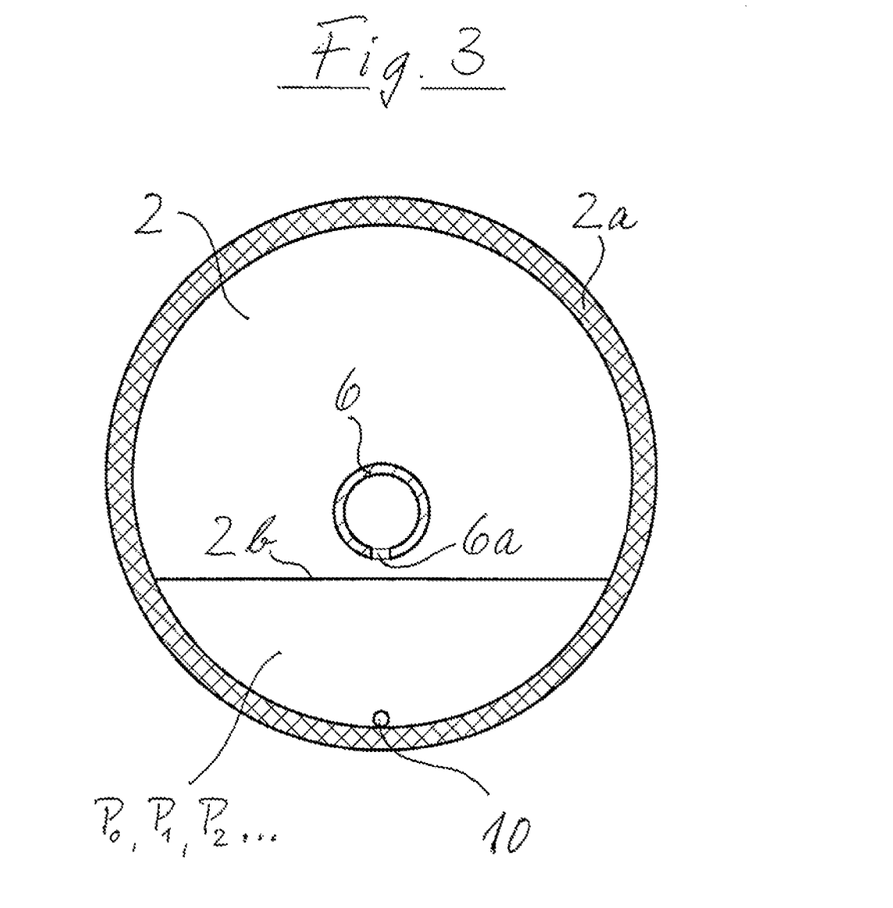
FIG. 3 is a cross section along the line III-III in FIG. 2.

During the operation of plate heat exchangers the through-flow openings 2 carry a flow of a first fluid, usually a gas, and the distribution lance 6 carries a flow of a second fluid, in general a liquid. While the distribution of the gaseous first fluid takes place without a problem to the correct plate intermediate spaces, the liquid fluid is fed by means of the distribution lance 6 first to the "incorrect" plate intermediate spaces $Z_0$, $Z_2$, in which the through-flow openings 2 are surrounded by the specified seals 2a. Thus, these "incorrect" plate intermediate spaces fill up with fluid until the lower edge of the through-flow openings 2 is reached. This state is shown in FIGS. 2 and 3.

With further supply of fluid, the plate areas within the seal 2a act as dams over which the fluid flows as a thin film on both sides downward into the "correct" plate gaps. Here, the lower edges of the through-flow openings 2 are formed by straight, horizontally running edge sections 2b, so that the overflow already begins with a certain width. The edge sections 2b here run at a level that preferably lies above half the distance between the lower edge of the seal 2a on one side and the distribution lance 6 on the other side.

For very large plate assemblies having long distribution lances 6, it can be expedient to increase the cross section of the outlet openings 6a with increasing distance from the fluid entrance. This achieves a more uniform distribution of the fluid onto the plate intermediate spaces following one after the other.

Figure 4:
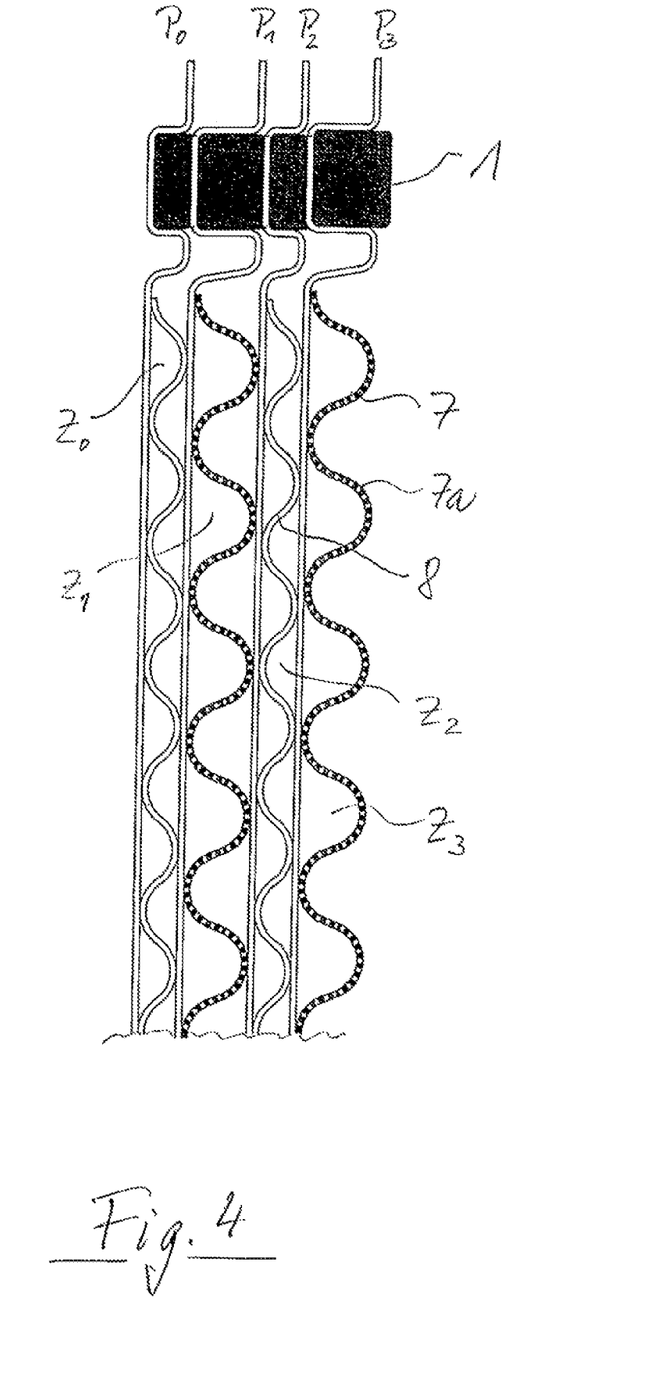
FIG. 4 is a horizontal section through some adjacent plates according to an embodiment of the invention.

FIG. 4 shows a horizontal section area through multiple plates. Here, spaces 7 and 8 in the form of corrugated inserts are arranged in the plate intermediate spaces. The spacers are dimensioned so that they contact both adjacent plates and thus create a support of the plates perpendicular to the plane of the plates. This arrangement prevents buckling of the plates when there are high differential pressures between adjacent plate intermediate spaces.

Here, the spacers that are arranged in those plate intermediate spaces that carry a flow of fluids to be mixed—in the embodiment the spacer 7—are provided with a plurality of openings 7a. In this way, the fluids pass through the spacer 7, which promotes their mixing.

FIG. 4 also shows that the plate intermediate spaces—differently than as shown in FIG. 3—can have different gap dimensions. In particular, the plate gaps carrying the flow of the fluids to be mixed can have a greater gap width than the plate gap that carries a flow of heating or cooling agent or is shut down.

Figure 5:
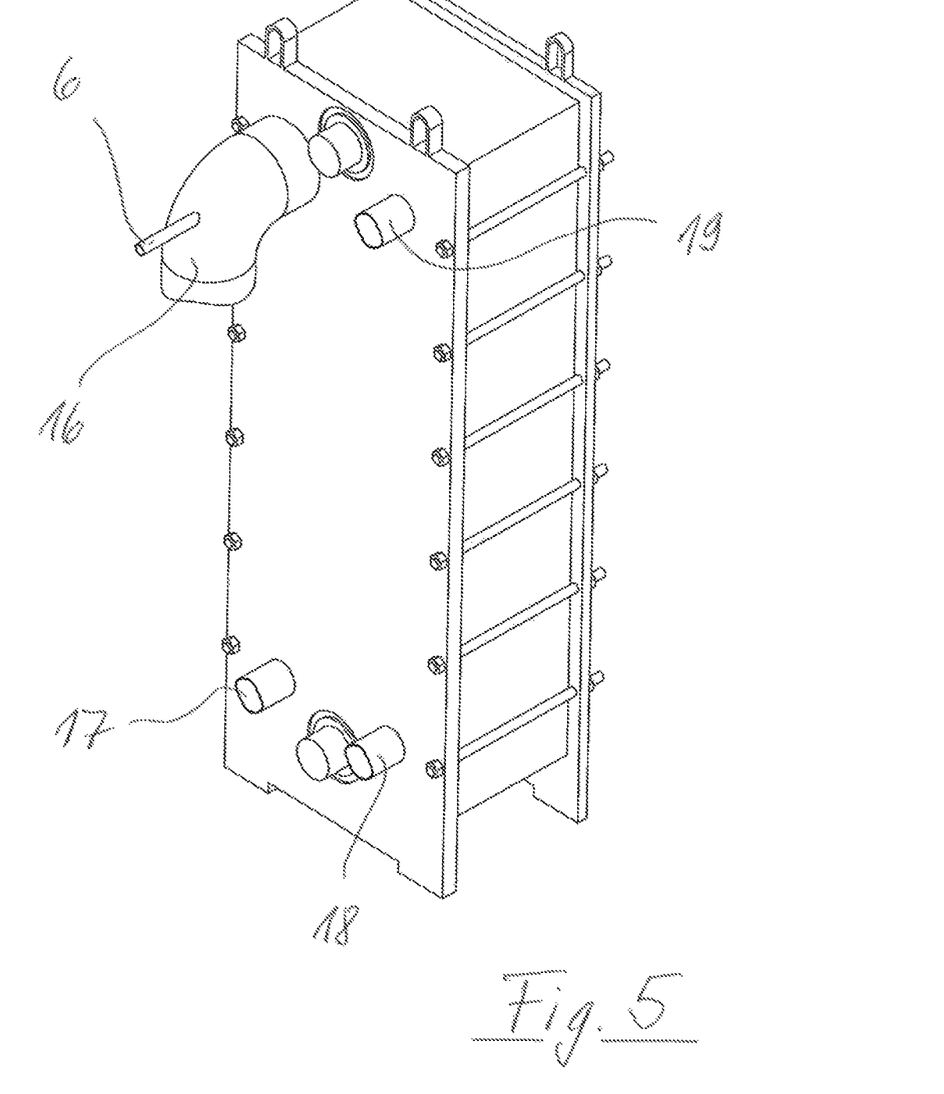
FIG. 5 is a perspective view of a plate apparatus according to an embodiment of the invention.

FIG. 5 shows a perspective view of a complete plate apparatus for use in an absorption process. Here, as in FIG. 1, the feeding of the gaseous or vaporous working medium and the solvent to be mixed with it is provided in the left upper region. While the solvent is fed to the distribution lance 6, the supply of the working medium is realized via a pipe elbow 16. The distribution lance 6 that runs in the interior of the plate holes 2 is sealed relative to the pipe elbow 16 and crosses through it at a suitable position. In this way, the working medium and the solvent can be fed separately and the mixture of both fluids begins only directly above the plates.

At the left lower edge, the solution enriched with working medium is discharged from the plate apparatus at a pipe connection 17.

Connection nozzles 18 and 19 are allocated to the through-flow openings 3 and 4 in FIG. 1 and are used for the supply and discharge, respectively, of cooling water that receives the heat released during the absorption process.

Figure 6:
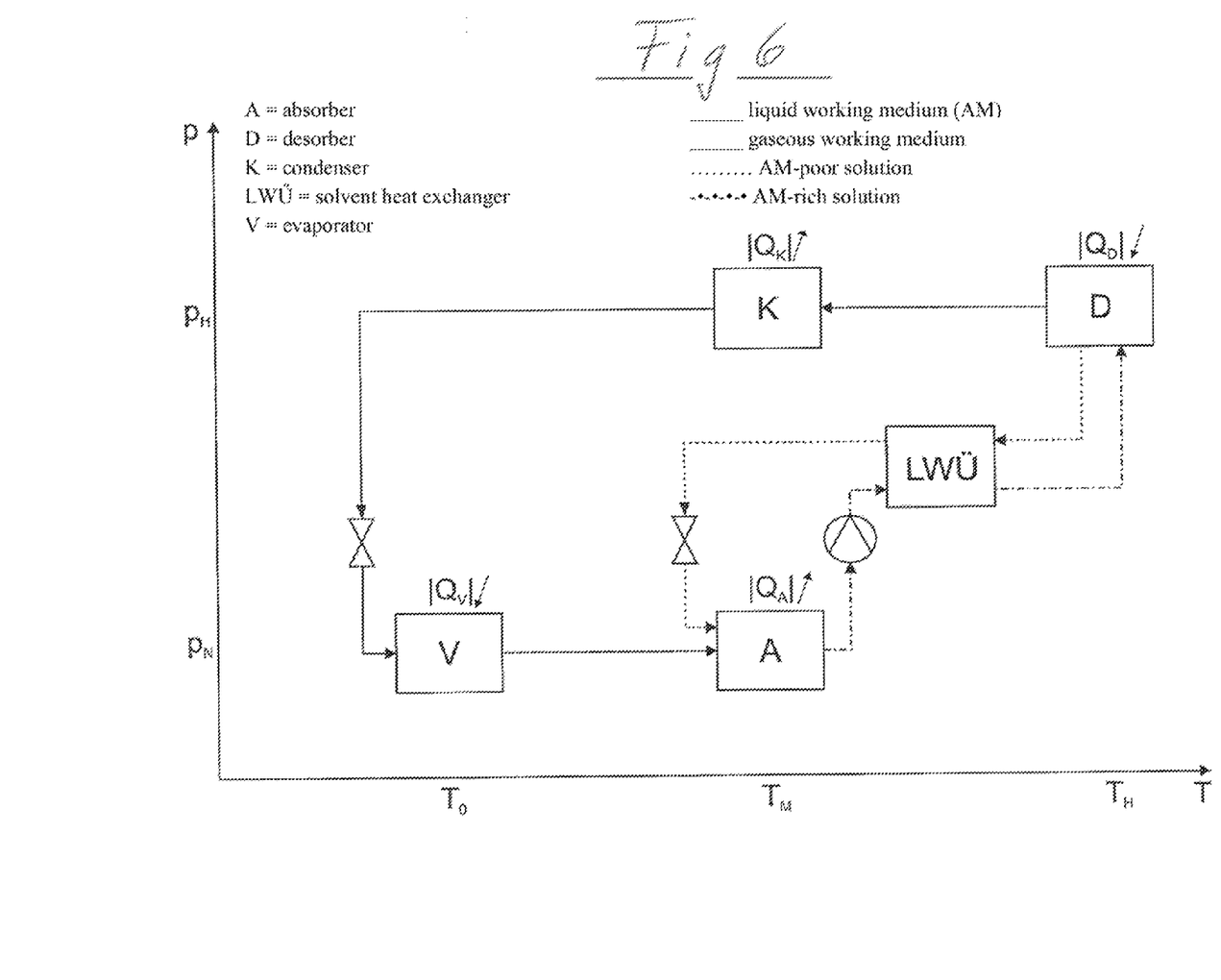
FIG. 6 is a schematic absorption circuit illustrating the use of a plate apparatus according to an embodiment of the invention as an absorption cooling unit.

FIG. 6 shows the preferred application of the plate apparatus in the context of an absorption process—in the shown embodiment in an absorption cooling unit, but the use is equally expedient in an absorption heat pump.

The function of absorption cooling units or heat pumps is known prior art and therefore will not be described in detail. What is essential in the present context is the construction of the absorber, which is marked in FIG. 6 by the reference symbol "A". A suitable working medium in a gaseous or vaporous consistency is fed to the absorber. This working medium is to be mixed with a solvent, so that an absorption process is produced between the two fluids. For this purpose, the solvent, which usually has a relatively viscous consistency, is fed to the distribution lance 6, while the gaseous or vaporous working medium is fed into the space surrounding the distribution lance. The mixing of the two fluids is then performed in the so-called second plate intermediate spaces, wherein a large reaction surface between the working medium and the solvent is provided by the fluid distribution across the width of the plate intermediate spaces. In this way, while crossing through the plate intermediate spaces, a strong absorption of the working medium by the solvent is produced, and after flowing through the plate intermediate spaces, the solvent is strongly enriched with working medium, when it leaves the plate intermediate space at the lower end.

The processing heat $Q_A$ released during the absorption process is received and dissipated by a fluid flowing in the specified first plate intermediate spaces.

In the present application the use was described in connection with an absorption process. However, it is equally within the scope of the invention to use the plate apparatus for chemical reactions, in which different media are to be mixed within one plate gap.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A plate apparatus suitable for heat and/or material exchange, the apparatus comprising a plurality of plates ($P_0$, $P_1$, $P_2$, $P_3$) that contact each other flush along a peripheral seal (1) while forming respective plate intermediate spaces ($Z_0$, $Z_1$, $Z_2$, $Z_3$) and that have upper through-flow openings (2, 3) and lower through-flow openings (4, 5) for fluids, wherein a group of these upper and lower through-flow openings (2, 5) is allocated to at least two fluids and is connected by correspondingly placed seals to every second one of the plate intermediate space ($Z_1$, $Z_3$) that carries a flow from top to bottom, wherein in flush upper through-flow openings (2) of the plates ($P_0$, $P_1$, $P_2$, $P_3$) a distribution lance (6) runs across these openings and has outlet openings (6a) for at least one of the fluids, and wherein the outlet openings (6a) of the distribution lance (6) are directed into the plate intermediate spaces ($Z_0$, $Z_2$) which are arranged between the second plate intermediate spaces ($Z_1$, $Z_3$) for the fluids to be mixed.

2. The plate apparatus according to claim 1, wherein the outlet openings (6a) are directed approximately radially downward and are positioned in the plate intermediate spaces ($Z_0$, $Z_2$).

3. The plate apparatus according to claim 1, wherein the through-flow openings (2) for the distribution lance (6) have an approximately horizontally running lower edge (2b).

4. The plate apparatus according to claim 3, wherein the horizontally running lower edge (2b) has a length of at least 60%, optionally 75%, of a diameter of the through-flow opening (2).

5. The plate apparatus according to claim 1, wherein the plates ($P_0$, $P_1$, $P_2$, $P_3$) have at least one smaller discharge opening (10) underneath the through-flow openings (2) surrounding the distribution lance (6).

6. The plate apparatus according to claim 5, wherein the smaller discharge opening (10) is positioned in a lowest region above a seal (2a) surrounding the through-flow opening (2).

7. The plate apparatus according to claim 1, wherein the distribution lance (6) is allocated to a fluid in liquid phase.

8. The plate apparatus according to claim 1, wherein a region of the through-flow openings (2) surrounding the distribution lance (6) is allocated to a fluid in gas phase.

9. The plate apparatus according to claim 1, wherein for two fluids to be mixed with each other, the distribution lance (6) is allocated to a more viscous fluid of the two fluids.

10. The plate apparatus according to claim 1, wherein the at least one of the fluids allocated to the distribution lance (6) is a fluid suitable for absorption of another fluid.

11. The plate apparatus according to claim 10, wherein the fluid allocated to the distribution lance (6) is an ionic fluid.

12. The plate apparatus according to claim 1, wherein the plate intermediate spaces ($Z_0$, $Z_2$) arranged adjacent to the second plate intermediate spaces ($Z_1$, $Z_3$) are connectable to a heating or cooling medium.

13. The plate apparatus according to claim 1, wherein at least the second plate intermediate spaces ($Z_1$, $Z_3$) allocated to the fluids to be mixed contain a spacer (7).

14. The plate apparatus according to claim 13, wherein the spacer (7) is constructed as a wave-shaped profile.

15. The plate apparatus according to claim 13, wherein the spacer (7) has a plurality of through-flow openings (7a).

16. The plate apparatus of the plate apparatus according to claim 1, wherein the apparatus is designed as an absorber.

17. The plate apparatus according to claim 16, wherein two fluids performing an absorption process in the absorber are allocated to the second plate intermediate spaces ($Z_1$, $Z_3$), and one of the two fluids flows through the distribution lance (6).

18. The plate apparatus according to claim 17, wherein a liquid or viscous fluid flows through the distribution lance (6).

19. The plate apparatus according to claim 17, wherein a gaseous or vaporous fluid flows into a space surrounding the distribution lance (6).

20. The plate apparatus according to claim 18, wherein the liquid fluid is an ionic fluid.

* * * * *